United States Patent
Iwamoto

(10) Patent No.: US 11,550,115 B2
(45) Date of Patent: Jan. 10, 2023

(54) LENS BARREL AND CAMERA DEVICE

(71) Applicant: Nittoh Inc., Nagano (JP)

(72) Inventor: Takashi Iwamoto, Nagano (JP)

(73) Assignee: Nittoh Inc., Nagano (JP)

( * ) Notice: Subject to any disclaimer, the term of this patent is extended or adjusted under 35 U.S.C. 154(b) by 301 days.

(21) Appl. No.: 16/771,685

(22) PCT Filed: Nov. 5, 2018

(86) PCT No.: PCT/JP2018/041049
§ 371 (c)(1),
(2) Date: Jun. 11, 2020

(87) PCT Pub. No.: WO2019/123862
PCT Pub. Date: Jun. 27, 2019

(65) Prior Publication Data
US 2021/0072489 A1 Mar. 11, 2021

(30) Foreign Application Priority Data
Dec. 20, 2017 (JP) .............................. JP2017-243936

(51) Int. Cl.
*H04N 5/225* (2006.01)
*G03B 3/10* (2021.01)
(Continued)

(52) U.S. Cl.
CPC ................. *G02B 7/04* (2013.01); *G03B 3/10* (2013.01); *G03B 13/34* (2013.01); *H04N 5/2254* (2013.01); *G03B 2205/0069* (2013.01)

(58) Field of Classification Search
CPC ............ G02B 7/04; G02B 7/021; G02B 7/08; G03B 3/10; G03B 13/34; G03B 2205/0069; H04N 5/2254
See application file for complete search history.

(56) References Cited

U.S. PATENT DOCUMENTS

| 2015/0207744 A1 | 7/2015 | Diab et al. | |
| 2018/0052298 A1* | 2/2018 | Sueoka | G02B 7/04 |
| 2020/0292780 A1* | 9/2020 | Abe | G03B 17/02 |

FOREIGN PATENT DOCUMENTS

| JP | 3996863 B2 * 10/2007 | ............... G02B 7/04 |
| JP | 2010169844 A 8/2010 | |

(Continued)

OTHER PUBLICATIONS

Extended European Search Report in EP Application No. 18891560.7, dated Aug. 13, 2021. 6pp.

*Primary Examiner* — Nhan T Tran
(74) *Attorney, Agent, or Firm* — Hauptman Ham, LLP

(57) ABSTRACT

A lens barrel has at least one movable lens group that can move in one direction and the other direction along the optical axis, the lens barrel comprising: a movable lens frame; a voice coil motor for driving a movable lens group and the movable lens frame along the optical axis; and a stopper mechanism brought into contact with the movable lens frame. The stopper mechanism includes a stopper member that moves between a retracted position where the stopper member does not touch the movable lens frame when the voice coil motor is energized, and an abutting position where the stopper member is brought into contact with the movable lens frame when the voice coil motor is not energized.

7 Claims, 10 Drawing Sheets

(51) Int. Cl.
*G02B 7/04* (2021.01)
*G03B 13/34* (2021.01)

(56) References Cited

FOREIGN PATENT DOCUMENTS

| | | | | |
|---|---|---|---|---|
| JP | 2010243877 A | 10/2010 | | |
| JP | 2010271607 A | 12/2010 | | |
| JP | 2013178376 A | * | 9/2013 | ............... G02B 7/04 |

* cited by examiner

LENS BARREL AND CAMERA DEVICE

CROSS REFERENCE TO RELATED APPLICATION

This is a U.S. national stage of application No. PCT/JP2018/041049, filed on Nov. 5, 2018. Priority under 35 U.S.C. § 119(a) and 35 U.S.C. § 365(b) is claimed from Japanese Patent Applications No. 2017-243936 filed on Dec. 20, 2017.

TECHNICAL FIELD

The present invention relates to a lens barrel and a camera device.

BACKGROUND ART

In many digital cameras and digital video cameras, an optical element such as a lens is driven using an actuator. One of such actuators is, as described in Patent Literature 1, for example, configured to move an optical element such as a lens by using a voice coil motor, to thereby prevent recording of the noise generated from a motor or the like when taking, particularly, a moving image, or the like. Patent Literature 1 discloses a configuration to prevent a collision noise when the voice coil motor moves the optical element to a mechanical end.

CITATION LIST

{Patent Literature}
{PTL 1} JP 2010-243877

SUMMARY OF INVENTION

Technical Problem

By the way, in the above-described voice coil motor, position holding is impossible when the voice coil motor is not energized unlike a configuration to rotate a lead screw or the like by a motor. Accordingly, there is a problem that the optical element to be driven by the voice coil motor, when being in a non-energized state, moves by a distance movable along a guide shaft.

Such a movement of the optical element may cause abnormal noise due to a collision inside a lens barrel and is not preferable because it may give an unpleasant impression to a user. Further, due to a case such that the optical element repeatedly moves inside the lens barrel for a long time, the product-life cycle of the lens barrel may be shortened. Accordingly, it is desired that it is possible to prevent the optical element from moving inside the lens barrel even when the voice coil motor is not energized, but the configuration disclosed in Patent Literature 1 fails to prevent the movement of the optical element.

The present invention has been made in consideration of the above-described circumstances, and has an object to provide a lens barrel and a camera device capable of preventing an optical element from moving inside the lens barrel even when a voice coil motor is not energized.

Solution to Problem

In order to solve the above-described problem, according to a first aspect of the present invention, there is provided a lens barrel including at least one movable lens group capable of moving to one side and the other side in an optical axis direction, the lens barrel including: a movable lens frame that moves integrally with the movable lens group; a voice coil motor that drives the movable lens group and the movable lens frame along the optical axis direction; and a stopper mechanism that stops movement of the movable lens frame to one direction and the other direction in the optical axis direction, in which the stopper mechanism includes: a stopper member that moves to a retracted position retracted from an abutting position where the stopper member abuts on the movable lens frame while the voice coil motor is energized and moves to the abutting position where the stopper member abuts on the movable lens frame while the voice coil motor is not energized; and a driving mechanism that moves the stopper member between the retracted position and the abutting position.

Further, according to another aspect of the present invention, in the above-described invention, preferably, the stopper mechanism includes an abutting member that abuts on the movable lens frame together with the stopper member when the movable lens frame moves to an end portion on one side in the optical axis direction, and the movable lens frame is held between the stopper member and the abutting member.

Further, according to another aspect of the present invention, in the above-described invention, preferably, the abutting member is an elastic shock absorbing member.

Further, according to another aspect of the present invention, in the above-described invention, preferably, the lens barrel further includes: at least a first movable lens group and a second movable lens group that correspond to the movable lens group; and at least a first movable lens frame and a second movable lens frame that correspond to the movable lens frame, in which the first movable lens group is supported by the first movable lens frame and the second movable lens group is supported by the second movable lens frame, the stopper mechanism is attached to the second movable lens frame, the first movable lens frame is disposed on one side in the optical axis direction relative to the second movable lens frame, the abutting member is disposed on one side in the optical axis direction relative to the first movable lens frame, an elastic shock absorbing member is disposed at portions facing each other on one of the first movable lens frame and the second movable lens frame, and when the first movable lens frame is pushed to one side in the optical axis direction together with the second movable lens frame by driving of the voice coil motor, the first movable lens frame is held between the abutting member and the shock absorbing members and the second movable lens frame is held between the shock absorbing members and the stopper member.

Further, according to another aspect of the present invention, in the above-described invention, preferably, a long-shaped sleeve portion for locking that includes a stepped portion with a locking surface on which the stopper member is locked is provided on the movable lens frame.

Further, according to another aspect of the present invention, in the above-described invention, preferably, the sleeve portion for locking is provided on a side closer to the voice coil motor than to a long-axis cylindrical portion into which a guide shaft to guide sliding of the movable lens frame is inserted.

Further, according to another aspect of the present invention, in the above-described invention, preferably, the driving mechanism includes a stepping motor, and the stopper member is a turn stopper that is turned by the stepping motor.

Further, according to another aspect of the present invention, in the above-described invention, preferably, the lens barrel further includes: a control means that controls drivings of the voice coil motor and the driving mechanism, in which when it is determined that power of a camera main body to which the lens barrel is attached is off or it is determined that the lens barrel has been released from the camera main body, the control means controls driving of the voice coil motor to move the second movable lens frame to one side in the optical axis direction, and after the second movable lens frame is moved to one side in the optical axis direction, the control means controls driving of the driving mechanism to move the stopper member to the abutting position.

Further, according to the present invention, there is provided a camera device including: the lens barrel according to any one of the above-described inventions; and a camera main body to which the lens barrel is attached.

Advantageous Effects of Invention

According to the present invention, it is possible to provide a lens barrel and a camera device capable of preventing an optical element from moving inside the lens barrel even when a voice coil motor is not energized.

DESCRIPTION OF EMBODIMENTS

Hereinafter, there will be explained a lens barrel 10 and a camera device 1 according to one embodiment of the present invention based on the drawings. Incidentally, in the following explanation, in the extending direction (X direction) of an optical axis L of an imaging optical system of the lens barrel 10, the subject side is defined as the front side (X1 side) and the camera main body 110 side is defined as the rear side (X2 side). Further, in the direction (Y direction) orthogonal to the optical axis, the direction approaching the optical axis L is defined as the inside and the direction going away from the optical axis L is defined as the outside. Further, the circumferential direction around the optical axis L is defined as the circumferential direction.

Figure 1:
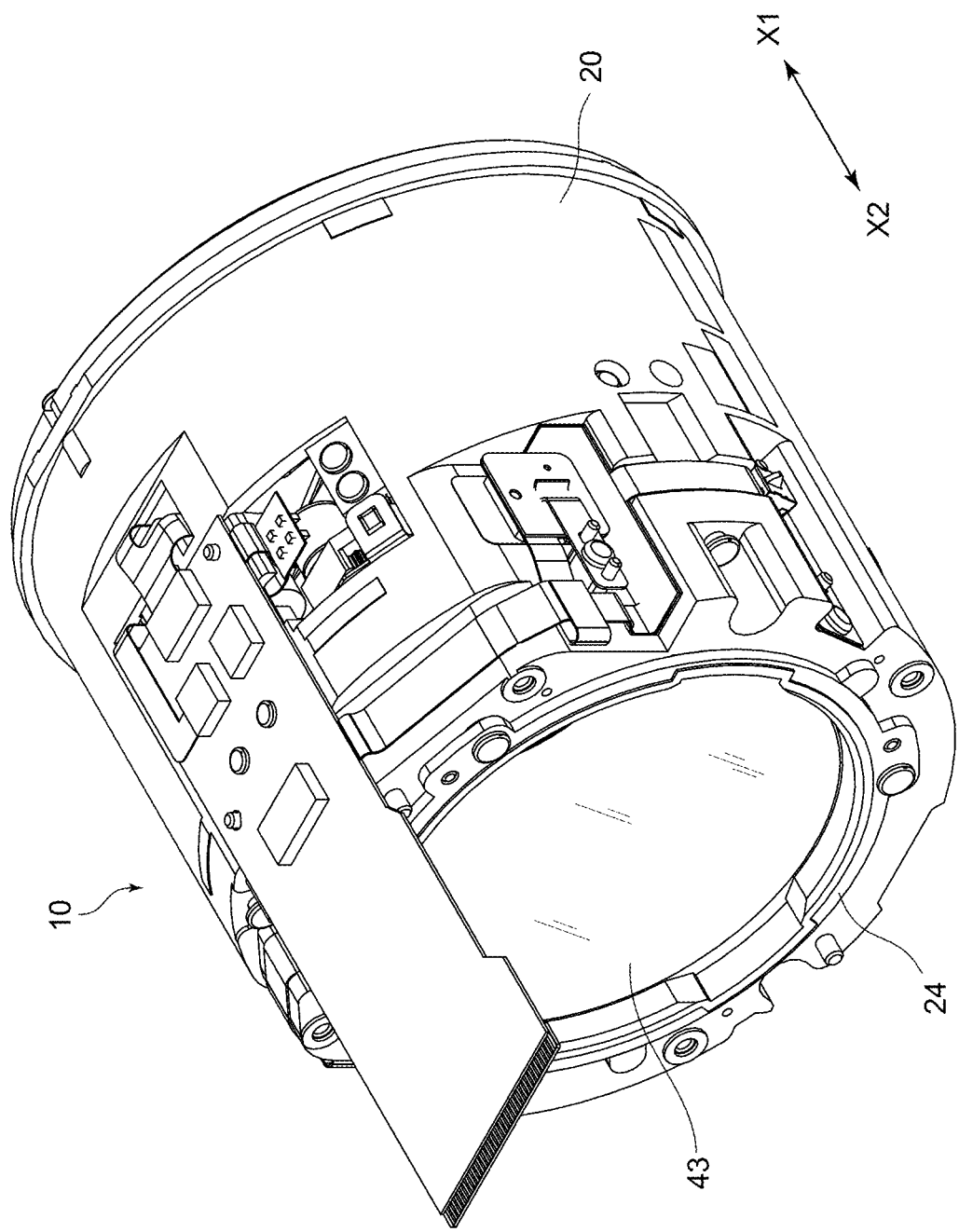
FIG. 1 is a perspective view illustrating a lens barrel according to one embodiment of the present invention.
Figure 2:
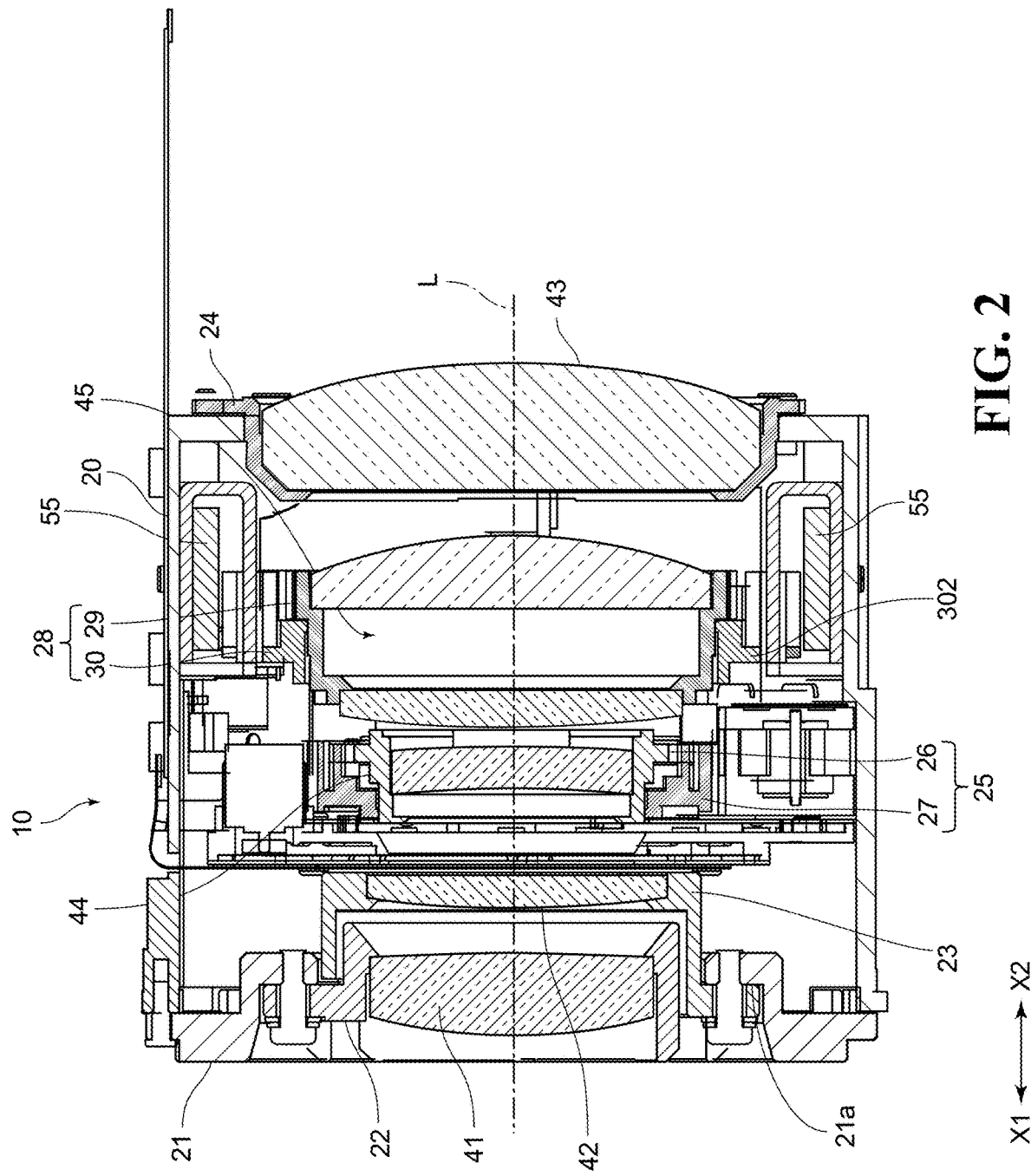
FIG. 2 is a cross-sectional view of the lens barrel illustrated in FIG. 1 cut along an optical axis.
Figure 3:
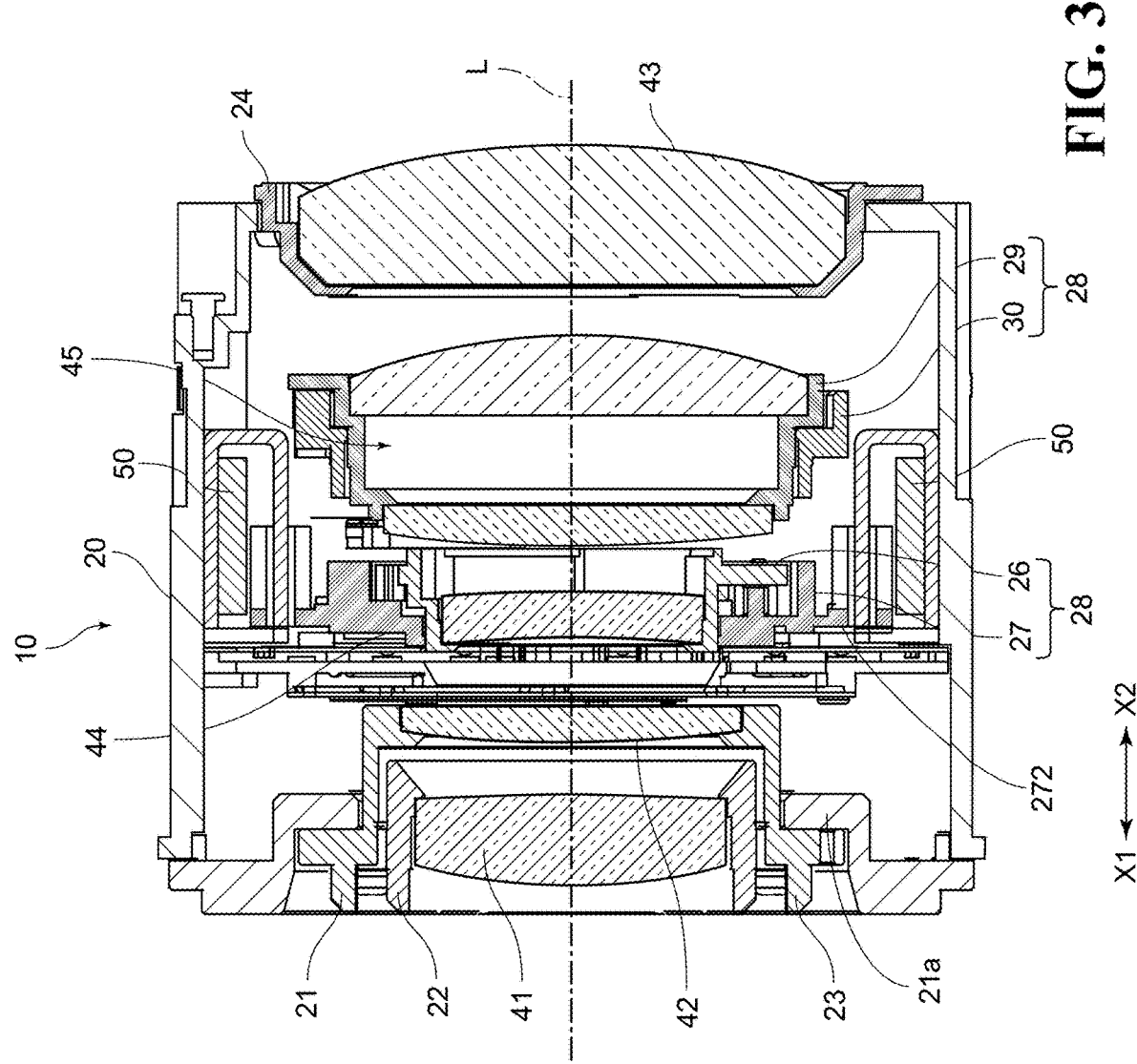
FIG. 3 is a cross-sectional view of the lens barrel that is cut along the optical axis of the lens barrel illustrated in FIG. 1 and is located at a position different by 90 degrees in the circumferential direction from FIG. 2.

FIG. 1 is a perspective view illustrating the lens barrel 10 according to one embodiment of the present invention. FIG. 2 is a cross-sectional view of the lens barrel 10 illustrated in FIG. 1 cut along the optical axis L. FIG. 3 is a cross-sectional view of the lens barrel 10 that is cut along the optical axis L of the lens barrel 10 and is located at a position different by 90 degrees in the circumferential direction from FIG. 2.

As illustrated in FIG. 1 to FIG. 3, the lens barrel 10 has an outer peripheral barrel portion 20. The outer peripheral barrel portion 20 is a portion that is provided in a cylindrical shape and accommodates optical elements and the like in the cylindrical portion and supports them in a fixed state or an operating state.

A front end fixed frame 21 is attached to the front side (X1 side) of the outer peripheral barrel portion 20. In the inner diameter side of the front end fixed frame 21, there is provided a flange portion 21a that is stepped toward the rear side (X2 side) with respect to an outer peripheral portion. To the flange portion 21a, an outer peripheral portion of a first fixed lens frame 22 is fixed, and to the first fixed lens frame 22, a first fixed lens group 41 is attached. Incidentally, on the outer peripheral portion of the first fixed lens frame 22, a plurality of wing portions are intermittently provided in the circumferential direction, and the wing portions are fixed to the flange portion 21a.

In the meantime, an outer peripheral portion of a second fixed lens frame 23 is also fixed on the flange portion 21a, and a second fixed lens group 42 is attached to the second fixed lens frame 23. At this time, the second fixed lens group 42 is attached so as to be close to the first fixed lens group 41. Also on the outer peripheral portion of the second fixed lens frame 23, a plurality of wing portions, which are the same as those on the outer peripheral portion of the above-described first fixed lens frame 22, are provided intermittently in the circumferential direction. Then, the wing portions of the first fixed lens frame 22 and the wing portions of the second fixed lens frame 23 are fixed to the flange portion 21a in a state of being located at different angles in the circumferential direction.

Incidentally, the number of wing portions of each of the first and second fixed lens frames 22, 23 may be any number as long as it is two or more, but the number of wing portions of the first fixed lens frame 22 and the number of wing portions of the second fixed lens frame 23 are preferably the same.

Further, as illustrated in FIG. 2 and FIG. 3, on the rear side (X2 side) of the outer peripheral barrel portion 20, a third fixed lens group 43 is attached via a third fixed lens frame 24. With such an attachment state, a first movable lens group 44 and a second movable lens group 45, which will be described later, are located in a space between the second fixed lens group 42 and the third fixed lens group 43. Incidentally, the first movable lens group 44 and the second movable lens group 45 correspond to a movable lens group, but only one of these may correspond to the movable lens group.

Incidentally, the first fixed lens group 41 and the second fixed lens group 42 may be combined into a single lens group, or another lens group other than these may be included. Further, the first fixed lens group 41, the second fixed lens group 42, and the third fixed lens group 43 may consist of one lens, or may consist of a plurality of lenses.

Between the above-described second fixed lens group 42 and the above-described third fixed lens group 43, the first movable lens group 44 and the second movable lens group 45 are disposed. The first movable lens group 44 is attached to a first movable lens frame 25. Further, the second movable lens group 45 is attached to a second movable lens frame 28. Incidentally, the first movable lens frame 25 and the second movable lens frame 28 correspond to a movable lens frame, but only one of these may correspond to the movable lens frame. Further, the first movable lens group 44 and the second movable lens group 45 may consist of one lens, or may consist of a plurality of lenses.

Figure 4:
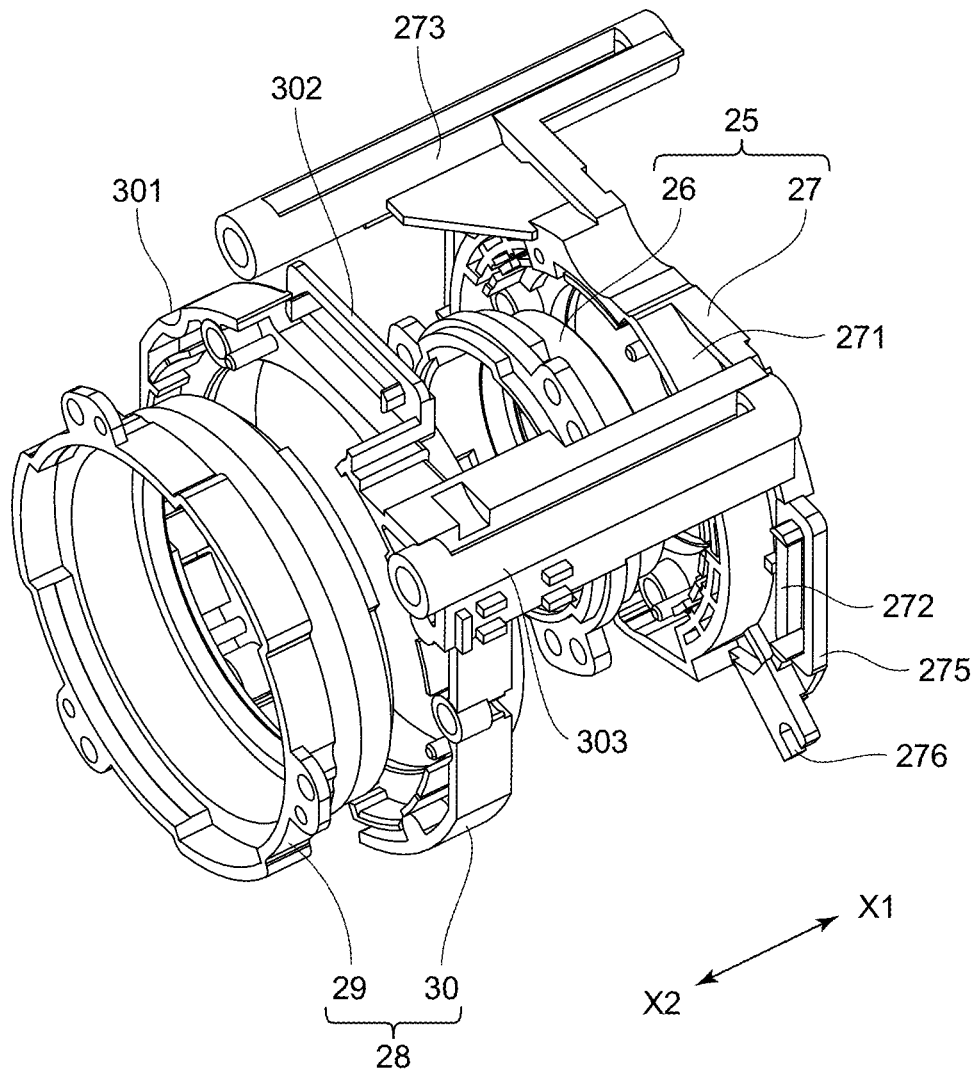
FIG. 4 is an exploded perspective view illustrating a configuration of a first movable lens frame and a second movable lens frame of the lens barrel illustrated in FIG. 1.
Figure 5:
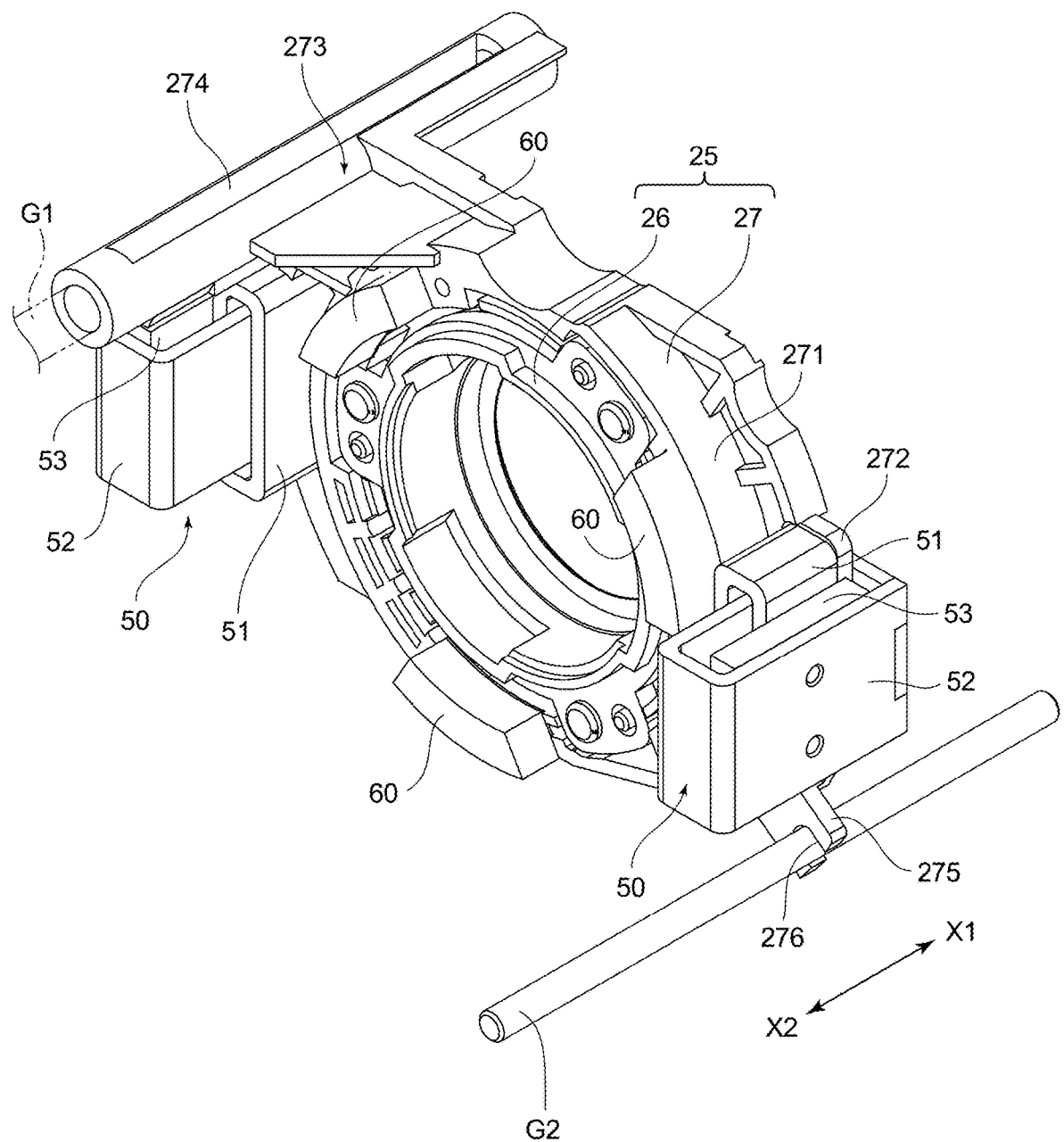
FIG. 5 is a perspective view illustrating a configuration of the first movable lens frame and its periphery of the lens barrel illustrated in FIG. 1.
Figure 6:
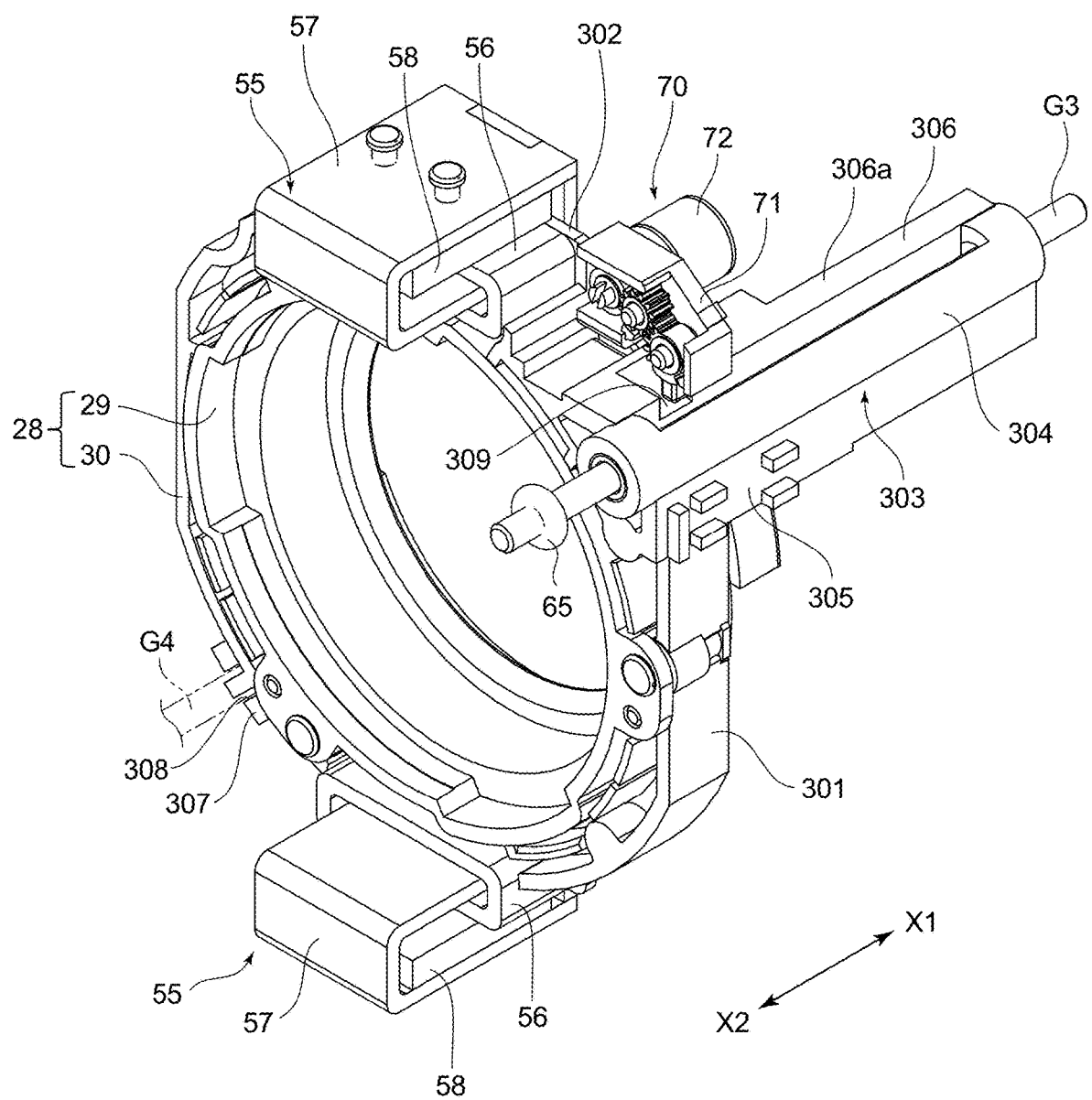
FIG. 6 is a perspective view illustrating a configuration of the second movable lens frame and its periphery of the lens barrel illustrated in FIG. 1.

FIG. 4 is an exploded perspective view illustrating a configuration of the first movable lens frame 25 and the second movable lens frame 28. FIG. 5 is a perspective view illustrating a configuration of the first movable lens frame 25 and its periphery. Further, FIG. 6 is a perspective view illustrating a configuration of the second movable lens frame 28 and its periphery.

As illustrated in FIG. 2 to FIG. 4, the first movable lens frame 25 is disposed on the front side (X1 side) relative to the second movable lens frame 28. Further, as illustrated in FIG. 4 and FIG. 5, the first movable lens frame 25 has a lens supporting frame 26 and a first slide frame 27. The lens supporting frame 26 is a member to which the first movable lens group 44 is attached on its inner peripheral side. Further, the first slide frame 27 has a ring-shaped portion 271, and to an inner peripheral side of the ring-shaped portion 271, the lens supporting frame 26 is fixed and attached.

On the ring-shaped portion 271, a pair of first voice coil attachment portions 272 is provided. To the first voice coil attachment portion 272, a coil portion 51 composing a voice coil motor 50 (see FIG. 5) is attached. In this embodiment, the first voice coil attachment portions 272 are present at two locations at about 180-degree intervals in the circumferential direction of the ring-shaped portion 271.

Further, on the first slide frame 27, a first guide arm portion 273 is provided integrally with the ring-shaped portion 271. The first guide arm portion 273 is provided so as to extend toward the front side (X1 side) and the rear side (X2 side) of the ring-shaped portion 271. The first guide arm portion 273 is provided with a cylindrical portion 274 and a sleeve portion for detection whose illustration is omitted. The cylindrical portion 274 is a long cylindrical portion, into which a long-shaped guide shaft G1 is inserted. Further, on the side of the ring-shaped portion 271 opposite to the cylindrical portion 274 in the circumferential direction, a plate-shaped portion 275 protrudes outward radially, and into a recessed groove 276 of the plate-shaped portion, a long-shaped guide shaft G2 is inserted.

As above, the first voice coil attachment portions 272 are disposed at about 180-degree intervals in the circumferential direction of the ring-shaped portion 271, and further, a pair of the guide shafts G1 and G2 is also disposed at about 180-degree intervals in the circumferential direction of the ring-shaped portion 271. Thereby, the first movable lens frame 25 can stably slide in the optical axis direction (X direction) along a pair of the guide shafts G1 and G2.

Incidentally, as illustrated in FIG. 5, to each of the first voice coil attachment portions 272, the coil portion 51 composing the voice coil motor 50 is attached. The voice coil motor 50 includes, in addition to the coil portion 51, a yoke 52 and a magnet 53 that are attached to the outer peripheral barrel portion 20. Thereby, the movement of the first movable lens frame 25 can be controlled by controlling the direction and magnitude of current conducted to the coil portions 51. Further, the sleeve portion for detection whose illustration is omitted is provided with a portion for attaching thereto a magnet sheet (whose illustration is omitted) of a magnetic sensor 90 (see FIG. 10) intended for detecting a sliding amount of the first movable lens frame 25. Incidentally, the magnetic sensor 90 includes sensor elements such as a magnetoresistive element or a Hall element that face the above-described magnet sheet in a non-contact manner. Incidentally, as the sensor to detect the sliding amount of the first movable lens frame 25, another sensor other than the magnetic sensor 90, which is an encoder or the like capable of detecting a sliding amount optically, may be used.

Further, as illustrated in FIG. 5, shock absorbing members 60 are attached to the ring-shaped portion 271. The shock absorbing member 60 reduces impact caused when the first movable lens frame 25 and the second movable lens frame 28 collides, and is formed of an elastic material such as an elastomer or a sponge. In the configuration illustrated in FIG. 5, the three shock absorbing members 60 are attached at 120-degree intervals, but the number of shock absorbing members 60 to be attached may be any number.

Next, there will be explained a configuration of the second movable lens frame 28 and its periphery. As illustrated in FIG. 6, the second movable lens frame 28 has a lens supporting frame 29 and a second slide frame 30. The lens supporting frame 29 is a member to which the second movable lens group 45 is attached on its inner peripheral side. Further, the second slide frame 30 has a ring-shaped portion 301, and to an inner peripheral side of the ring-shaped portion 301, the lens supporting frame 29 is fixed and attached. Incidentally, the first slide frame 27 and the second slide frame 30 correspond to a slide frame, but only one of these may correspond to the slide frame.

Incidentally, as is clear from FIG. 4, the second movable lens frame 28 is located on the rear side (X2 side) relative to the first movable lens frame 25. Then, when the second movable lens frame 28 slides toward the front side (X1 side), the second movable lens frame 28 can push and move the first movable lens frame 25 to the front side (X1).

On the ring-shaped portion 301, a second voice coil attachment portion 302 is provided. To the second voice coil attachment portion 302, a coil portion 56 composing a voice coil motor 55 (see FIG. 6) is attached. Incidentally, the second voice coil attachment portions 302 are also present at two locations at about 180-degree intervals in the circumferential direction of the ring-shaped portion 301, similarly to the first voice coil attachment portion 272.

Further, on the second slide frame 30, a second guide arm portion 303 is provided integrally with the ring-shaped portion 301. The second guide arm portion 303 is provided so as to extend toward the front side (X1 side) relative to the ring-shaped portion 301. The second guide arm portion 303 is provided with a cylindrical portion 304, a sleeve portion for detection 305, and a sleeve portion for locking 306.

The cylindrical portion 304 is, similarly to the above-described cylindrical portion 274, a long cylindrical portion, into which a long-shaped guide shaft G3 is inserted. Further, a plate-shaped portion 307 protrudes outward radially at a portion of the ring-shaped portion 301, the portion is on the opposite side of the cylindrical portion 304 in the circumferential direction, and a long-shaped guide shaft G4 is inserted into a recessed groove 308 of the plate-shaped portion.

Accordingly, on the ring-shaped portion 301 as well, the second voice coil attachment portions 302 are disposed at about 180-degree intervals in the circumferential direction, and further, a pair of the guide shafts G3 and G4 is also disposed at about 180-degree intervals in the circumferential direction of the ring-shaped portion 301. Thereby, the second movable lens frame 28 can stably slide in the optical axis direction (X direction) along a pair of the guide shafts G3 and G4.

Incidentally, as illustrated in FIG. 6, to each of the second voice coil attachment portions 302, the coil portion 56 composing the voice coil motor 55 is attached. The voice coil motor 55 includes, in addition to the coil portion 56, a yoke 57 and a magnet 58 that are attached to the outer peripheral barrel portion 20, similarly to the above-described voice coil motor 50. Thereby, the movement of the second movable lens frame 28 can be controlled by controlling the direction and magnitude of current conducted to the coil portions 56.

As illustrated in FIG. 6, the sleeve portion for detection 305 is adjacently provided on one side of the cylindrical portion 304 in the circumferential direction. The sleeve portion for detection 305 is provided with a portion for attaching thereto a magnet sheet (whose illustration is omitted) of a magnetic sensor 95 (see FIG. 10) intended for detecting a sliding amount of the second movable lens frame 28. Incidentally, the magnetic sensor 95 is the same sensor as the above-described magnetic sensor 90, and its explanation is omitted.

Further, the long-shaped sleeve portion for locking 306 is adjacently provided on the other side of the cylindrical portion 304 in the circumferential direction. Concretely, the sleeve portion for locking 306 is provided on the side closer to the voice coil motor 55 than to the cylindrical portion 304. The sleeve portion for locking 306 is a portion intended for preventing the second movable lens frame 28 from returning to the rear side (X2 side) when the second movable lens frame 28 slides (moves) to the front side (X1 side). In order to achieve this, in the sleeve portion for locking 306, there is provided a locking recessed portion 309 recessed from a plane portion 306a which is formed along the optical axis direction (X direction), and in the locking recessed portion 309, a later-described locking projection 75c is fitted. Then, the locking projection 75c is brought into contact with an end surface 309a (corresponding to a locking surface) on the front side (X1 side) of the locking recessed portion 309, to thereby prevent the second movable lens frame 28 from returning to the rear side (X2 side). Incidentally, the locking recessed portion 309 corresponds to a stepped portion.

Figure 7:
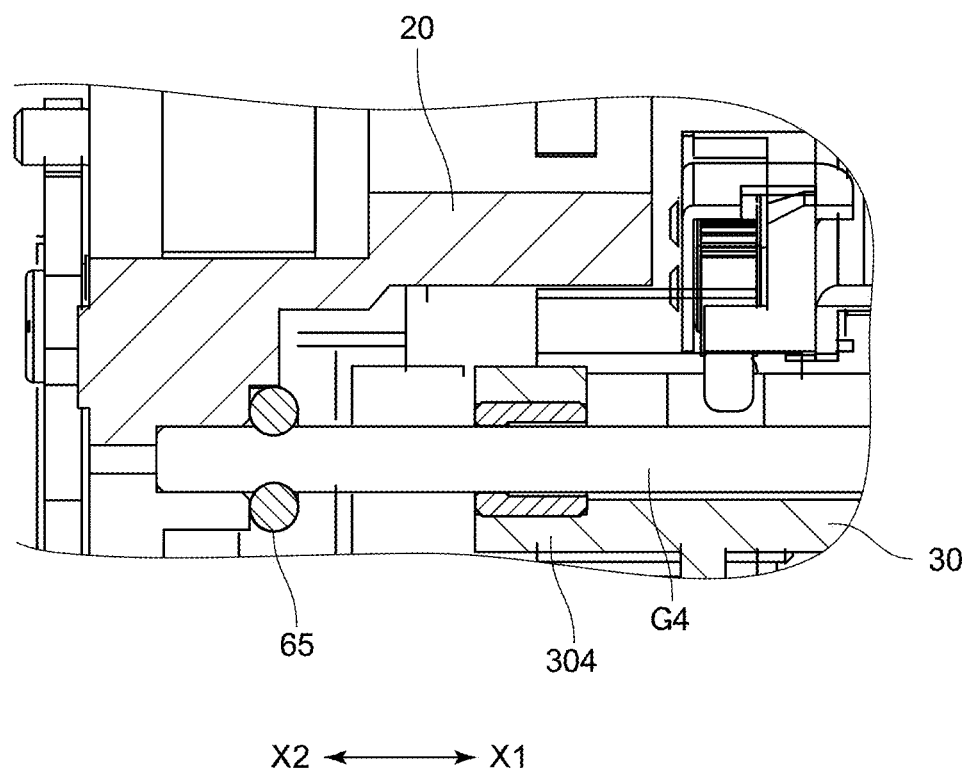
FIG. 7 is an enlarged partial cross-sectional view illustrating a configuration near a rear end side of a guide shaft of the lens barrel illustrated in FIG. 1.

Incidentally, to the rear end side (X2 side) of the guide shaft G3, a ring-shaped shock absorbing member 65 is attached. The shock absorbing member 65 is formed of an elastic material such as, for example, rubber. FIG. 7 is an enlarged partial cross-sectional view illustrating a configuration near the rear end side (X2 side) of the guide shaft G3. As illustrated in FIG. 7, the shock absorbing member 65 exists between the outer peripheral barrel portion 20 and the second slide frame 30 and is fixed to the guide shaft G3. The existence of the shock absorbing member 65 makes it possible to prevent the second slide frame 30 (cylindrical portion 304) from colliding with the outer peripheral barrel portion 20. Further, the shock absorbing member 65 is elastic, so that the occurrence of a collision noise is prevented even when the second slide frame 30 collides.

Incidentally, a shock absorbing member 66 (see FIG. 10), which is the same as the shock absorbing member 65, is also provided on the front end side (X1 side) of the guide shaft G1 and is fixed to the guide shaft G1. This makes it possible to prevent the first slide frame 27 (cylindrical portion 274) from colliding with the front end fixed frame 21. Further, the shock absorbing member 66 is elastic, so that the occurrence of a collision noise is prevented even when the second slide frame 30 collides. Incidentally, the shock absorbing member 66 corresponds to an abutting member, but the shock absorbing member 65 may also correspond to the abutting member.

Figure 8:
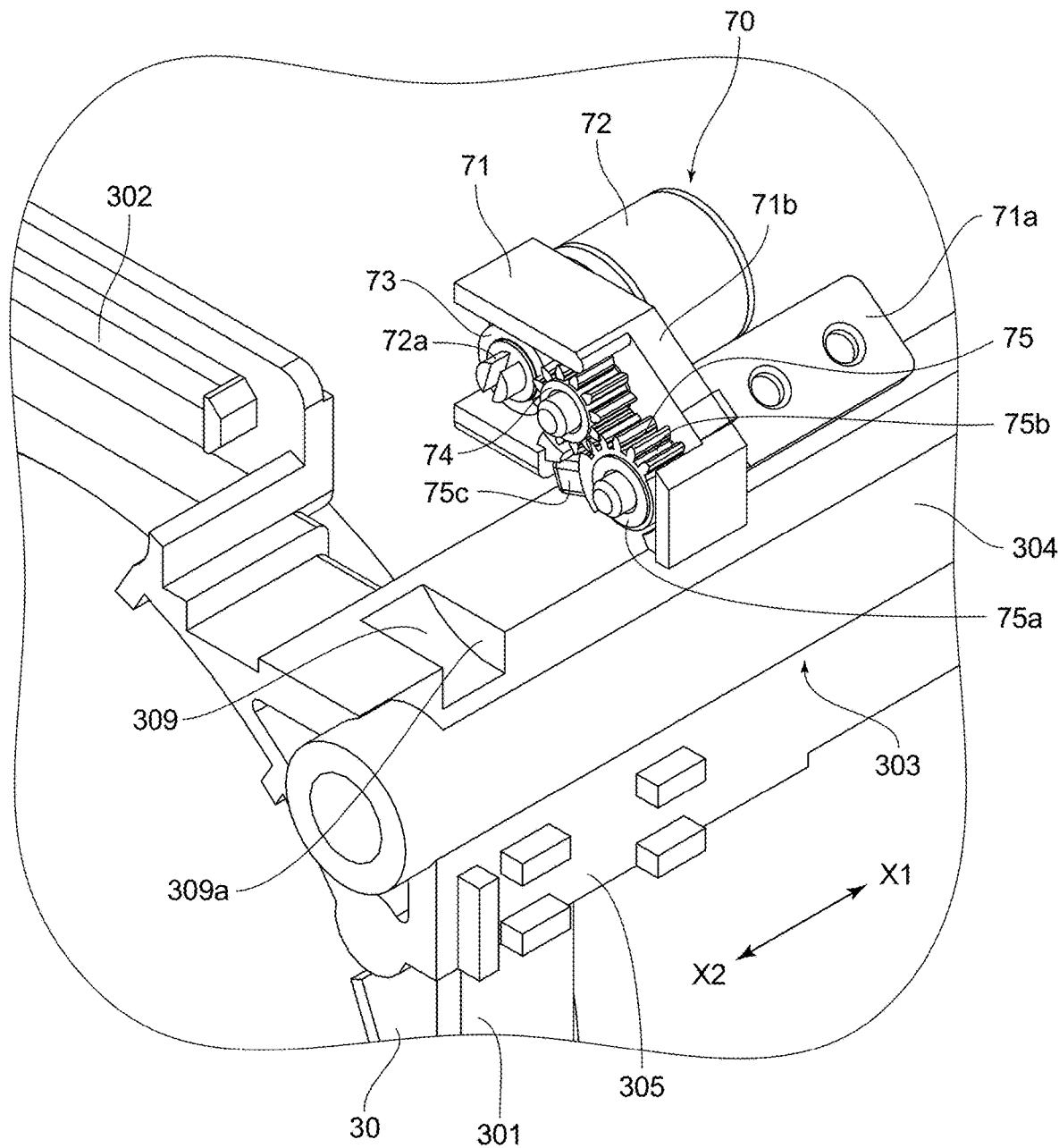
FIG. 8 is an enlarged partial perspective view illustrating a configuration near a stopper mechanism of the lens barrel illustrated in FIG. 1 and is a view illustrating a state where the second movable lens frame is slidable.
Figure 9:
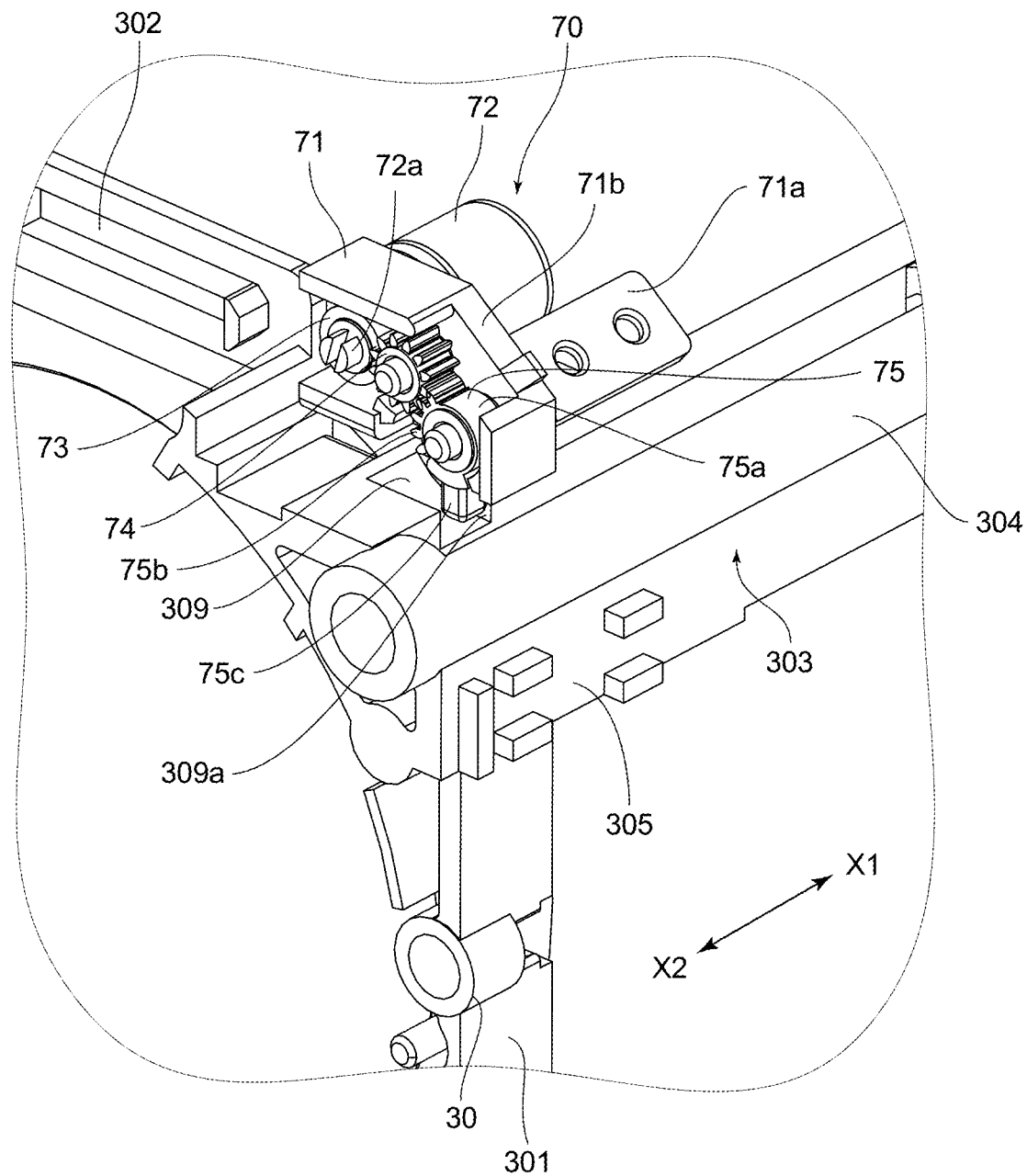
FIG. 9 is an enlarged partial perspective view illustrating the configuration near the stopper mechanism of the lens barrel illustrated in FIG. 1 and is a view illustrating a state where the second movable lens frame is not slidable.

Further, as illustrated in FIG. 6, in the lens barrel 10, there is provided a stopper mechanism 70 intended for, when the second movable lens frame 28 slides to the front side (X1 side), preventing the second movable lens frame 28 from returning to the rear side (X2 side) by locking the second movable lens frame 28 at the front side (X1 side). Such a stopper mechanism 70 is explained based on FIG. 8 and FIG. 9. FIG. 8 is an enlarged partial perspective view illustrating a configuration near the stopper mechanism 70 and is a view illustrating a state where the second movable lens frame 28 is slidable. FIG. 9 is an enlarged partial perspective view illustrating the configuration near the stopper mechanism 70 and is a view illustrating a state where the second movable lens frame 28 is not slidable.

As illustrated in FIG. 8 and FIG. 9, the stopper mechanism 70 includes an attachment frame 71, a drive motor 72, an output gear 73, an intermediate gear 74, and a turn stopper 75. Among them, the attachment frame 71 includes a fixing piece portion 71a whose longitudinal direction is the optical axis direction (X direction), the fixing piece portion 71a is fixed to the outer peripheral barrel portion 20, and thereby the entire stopper mechanism 70 is supported by the outer peripheral barrel portion 20. Further, on the attachment frame 71, there is provided a drive supporting piece portion 71b orthogonal to the fixing piece portion 71a. The drive supporting piece portion 71b fixes the drive motor 72 and supports the output gear 73, the intermediate gear 74, and the turn stopper 75 in freely rotatable state. Incidentally, the attachment frame 71 may or may not have other piece portions other than the fixing piece portion 71a and the drive supporting piece portion 71b.

The drive motor 72 is a part that applies a driving force for turning the later-described turn stopper 75. As the drive motor 72, a stepping motor that enables position control based on application of pulse power is preferable. However, another motor such as a DC motor or an ultrasonic motor may be used, or a solenoid, or the like may be used. Incidentally, the drive motor 72 corresponds to a driving mechanism.

Further, the output gear 73 is attached to an output shaft 72a of the drive motor 72 and engages with the intermediate gear 74. Therefore, when the output gear 73 is turned by driving of the drive motor 72, the intermediate gear 74 is also turned. Further, the intermediate gear 74 engages with gear portions 75b of the turn stopper 75. Incidentally, the turn stopper 75 corresponds to a stopper member. The turn stopper 75 includes an intermittent gear portion 75a obtained by the gear portions 75b being formed intermittently on a portion of a cylindrical portion.

Further, on the turn stopper 75, the locking projection 75c is provided. The locking projection 75c is a pillar part extending outward radially from an outer peripheral surface of the intermittent gear portion 75a where the gear portions 75b are not formed. The locking projection 75c is a part that is easily inserted into and removed from the above-described locking recessed portion 309.

That is, as illustrated in FIG. 8, the driving of the drive motor 72 enables the locking projection 75c to be located at a retracted position where the locking projection 75c is not inserted into the locking recessed portion 309. In this state, the second movable lens frame 28 (second slide frame 30) can freely slide to both the front side (X1 side) and the rear side (X2) in the optical axis direction (X direction). In contrast to this, as illustrated in FIG. 9, in a state where the second movable lens frame 28 (second slide frame 30) has moved to the foremost side (X1 side), driving the drive motor enables the locking projection 75c to be located at an abutting position where the locking projection 75c is inserted into the locking recessed portion 309. At this time, the locking projection 75c abuts on the end surface 309a of the locking recessed portion 309. Thereby, the second movable lens frame 28 (second slide frame 30) is prevented from moving to the rear side (X2 side).

Figure 10:
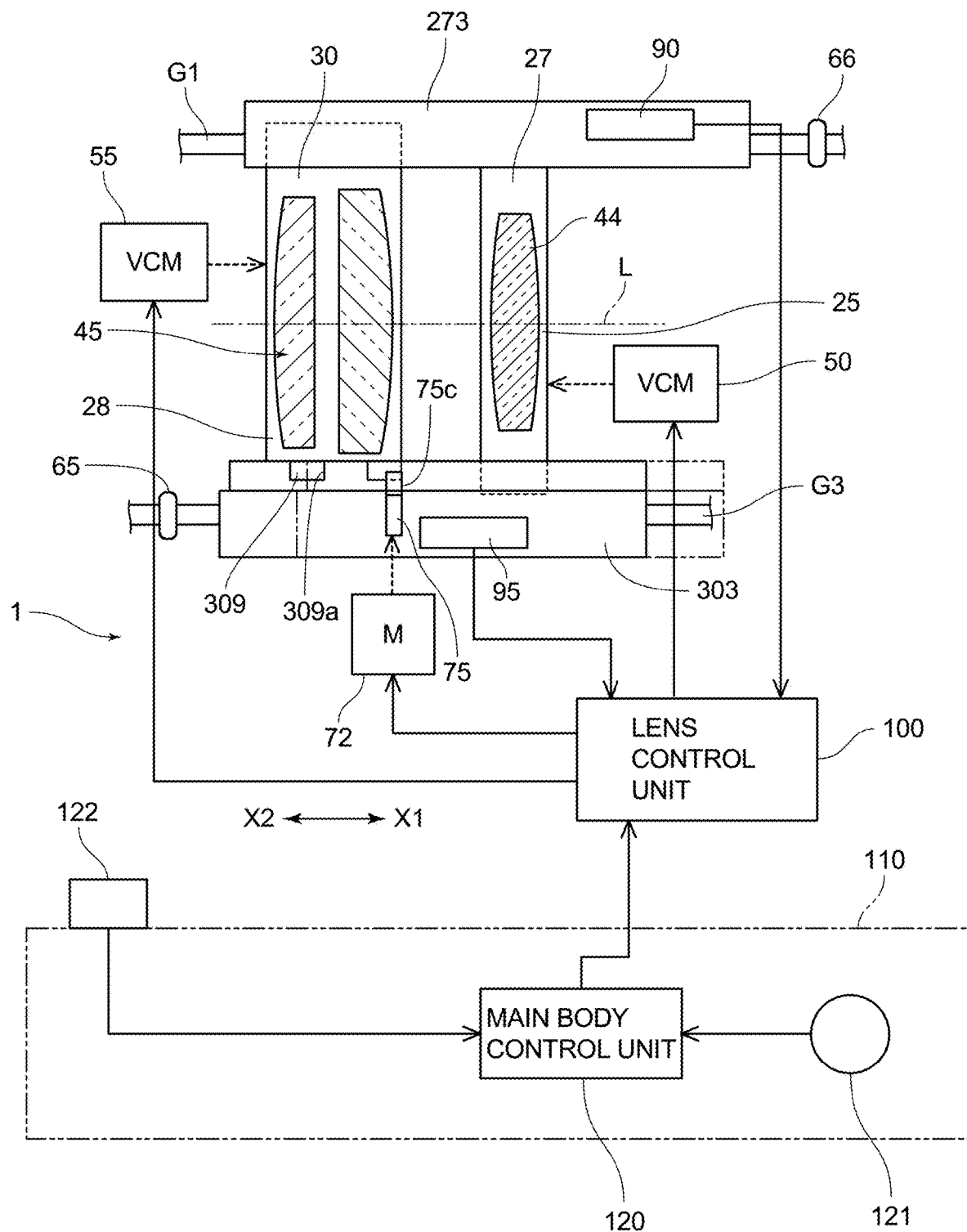
FIG. 10 is a schematic view illustrating a control configuration of the lens barrel illustrated in FIG. 1 and a control configuration of a camera device including the lens barrel and a camera main body.

Further, the lens barrel 10 includes a lens control unit 100. Incidentally, the lens control unit 100 corresponds to a control means, but a later-described main body control unit 120 may also correspond to the control means. FIG. 10 is a schematic view illustrating a control configuration of the lens barrel 10 illustrated in FIG. 1 and a control configuration of the camera device 1 including the lens barrel 10 and the camera main body 110. As illustrated in FIG. 10, the lens control unit 100 is a part that controls the overall operation of the lens barrel 10. The lens control unit 100 can be configured by a microcomputer including a CPU (Central Processing Unit) and external memories such as a ROM (Read Only Memory), a RAM (Random Access Memory), and a nonvolatile memory.

The lens control unit 100 can transmit/receive electrical signals to/from the main body control unit 120 of the camera main body 110. Then, the lens control unit 100 can control drivings of the voice coil motors 50, 55 based on the reception of the electrical signals from the main body control unit 120. However, the lens control unit 100 may control drivings of the voice coil motors 50, 55 without being based on the reception of the electrical signals from the main body control unit 120.

Incidentally, the lens control unit 100 exists in the lens barrel 10, but a configuration in which the lens control unit 100 exists on the camera main body 110 side may be employed. Further, the main body control unit 120 can be configured by a microcomputer including a CPU (Central Processing Unit) and external memories such as a ROM (Read Only Memory), a RAM (Random Access Memory), and a nonvolatile memory.

Further, as illustrated in FIG. 10, the main body control unit 120 is electrically connected to a power button 121 and a release button 122. Then, when the power button 121 is pressed to turn the power off or on, an electrical signal related to the power off or power on is supplied to the lens control unit 100. Further, when the release button 122 is pressed and the lens barrel 10 has been released from the camera main body 110, an electrical signal to that effect is supplied to the lens control unit 100.

(Regarding Operation)

In the lens barrel 10 and the camera device 1 having such a configuration as above, when the camera device 1 and the lens barrel 10 are in use, the voice coil motors 50 and the voice coil motors 55 are driven to move the first movable lens frame 25 (first movable lens group 44) and the second movable lens frame 28 (second movable lens group 45) to desired positions, and focusing is performed. At this time, the second movable lens frame 28 (second movable lens group 45) is in a state of being located at the rear side (X2 side) relative to the foremost side (X1 side), and the focusing is performed. Further, the first movable lens frame 25 (first movable lens group 44) is also moved to a desired position by the lens control unit 100 controlling and driving the voice coil motors 50.

Then, after the lens barrel 10 and the camera device 1 are used, by pressing the power button 121 or the release button 122, the main body control unit 120 transmits a signal corresponding to the power off to the lens control unit 100. Then, the lens control unit 100 drives the voice coil motors 55 to move the second movable lens frame 28 (second movable lens group 45) to the front side (X1 side).

At this time, the first movable lens frame 25 (first movable lens group 44) is pushed to the front side (X1 side) by the second movable lens frame 28 (second movable lens group 45). However, since the shock absorbing members 60 are attached to the portions, of the first side frame 27, facing the second slide frame 30, occurrence of abnormal noise caused by a collision of the first movable lens frame 25 (first movable lens group 44) with the second movable lens frame 28 (second movable lens group 45) is prevented when the above-described push is performed.

Incidentally, the voice coil motors 55 are driven so that the second movable lens frame 28 (second movable lens group 45) pushes the first movable lens frame 25 (first movable lens group 44) to a place where the shock absorbing member 66 (see FIG. 10) attached to the guide shaft G1 collides with the front end fixed frame 21. After the lens control unit 100 determines that the magnetic sensor 95 detects that the first movable lens frame 25 (first movable lens group 44) has moved to the foremost side (X1 side), the lens control unit 100 stops driving of the voice coil motors 55. Then, the voice coil motors 55 are not energized to make a state where the position holding of the second movable lens frame 28 (second movable lens group 45) by the voice coil motors 55 is not performed.

Here, after the magnetic sensor 95 detects that the first movable lens frame 25 (first movable lens group 44) has moved to the foremost side (X1 side), the lens control unit 100 drives the drive motor 72 so that the locking projection 75c of the turn stopper 75 is inserted into the locking recessed portion 309. Then, when the locking projection 75c is inserted into the locking recessed portion 309, the locking projection 75c abuts on the end surface 309a to prevent the second movable lens frame 28 (second movable lens group 45) from moving to the rear side (X2 side). Thereby, the second movable lens frame 28 (second movable lens group 45) and the first movable lens frame 25 (first movable lens group 44) are kept in a state of being located at the front side (X1 side), and the occurrence of noise caused by their movements inside the lens barrel 10 is prevented.

<Regarding Effects>

According to the lens barrel 10 and the camera device 1 having the above configuration, the following effects can be created. That is, the lens barrel 10 including the second movable lens group 45 (movable lens group) movable to one side and the other side along the optical axis L direction includes: the second movable lens frame 28 (movable lens frame) moving integrally with the second movable lens group 45 (movable lens group); the voice coil motors 55 driving the second movable lens frame 28 (movable lens group) and the second movable lens frame 28 (movable lens frame) along the optical axis L direction; and the stopper mechanism 70 stopping the movements of the second movable lens frame 28 (movable lens frame) to one direction and the other direction along the optical axis L direction. Then, the stopper mechanism 70 includes: the turn stopper 75

(stopper member) that moves, while the voice coil motor 55 is being energized, to the retracted position retracted from the abutting position where the turn stopper 75 abuts on the second movable lens frame 28 (movable lens frame) and moves, while the voice coil motor 55 is not being energized, to the abutting position where the turn stopper 75 abuts on the second movable lens frame 28 (movable lens frame); and the drive motor 72 (driving mechanism) that moves the turn stopper 75 (stopper member) between the retracted position and the abutting position.

For this reason, when the voice coil motor 55 is in a non-energized state, by the drive of the drive motor 72 (driving mechanism), the turn stopper 75 (stopper member) is moved to the abutting position where the turn stopper 75 abuts on the second movable lens frame 28 (movable lens frame) from the retracted position where it does not abut on the second movable lens frame 28 (movable lens frame). Therefore, the second movable lens frame 28 (movable lens frame) is prevented from moving in a state where the voice coil motor 55 is not energized. Therefore, the occurrence of abnormal noise caused by the second movable lens frame 28 moving inside the lens barrel 10 is prevented. Thereby, it is possible to prevent giving an unpleasant impression to a user.

Further, the movement of the second movable lens frame 28 is prevented, to thereby prevent a collision of the second movable lens group 45 inside the lens barrel 10. Therefore, shortening the product-life cycle of the lens barrel 10 is prevented.

Further, in this embodiment, the stopper mechanism 70 includes the shock absorbing member 66 (abutting member) that abuts on the first movable lens frame 25 (movable lens frame) together with the turn stopper 75 (stopper member) when the first movable lens frame 25 and the second movable lens frame 28 (movable lens frame) have moved to the end portion (end portion on the X1 side) on one side in the optical axis L direction. Then, the first movable lens frame 25 and the second movable lens frame 28 (movable lens frame) are held between the turn stopper 75 (stopper member) and the shock absorbing member 66 (abutting member).

Therefore, even when two or more movable lens frames (movable lens groups) exist as in the case where the first movable lens frame 25 (first movable lens group 44) and the second movable lens frame 28 (second movable lens group 45) exist, it is possible to hold them between the turn stopper 75 and the shock absorbing member 66. Accordingly, the movements of the first movable lens frame 25 (first movable lens group 44) and the second movable lens frame 28 (second movable lens group 45) are well prevented, and the abnormal noise caused by a collision inside the lens barrel 10 is prevented. Thereby, it is possible to prevent giving an unpleasant impression to a user. Further, by the above-described collision prevention, shortening the product-life cycle of the lens barrel 10 is prevented.

Further, in this embodiment, the abutting member is the elastic shock absorbing member 66. Therefore, it is possible to prevent the first movable lens frame 25 from colliding with a portion of such a casing as the front end fixed frame 21 when the first movable lens frame 25 is moved to the front end portion side (X1 side), resulting in that the occurrence of abnormal noise caused by a collision is prevented. Further, when the first movable lens frame 25 is moved to the front end portion side (X1 side), pushing the first movable lens frame 25 against the elastic force of the shock absorbing member 66 is enabled. Therefore, the first movable lens frame 25 and the second movable lens frame 28 (movable lens frame) are held between the turn stopper 75 (stopper member) and the shock absorbing member 66 (abutting member), and a state without rattling caused by their movements is maintained.

Further, in this embodiment, at least the first movable lens group 44 and the second movable lens group 45 that correspond to the movable lens group are included, and at least the first movable lens frame 25 and the second movable lens frame 28 that correspond to the movable lens frame are included. Further, the first movable lens group 44 is supported by the first movable lens frame 25 and the second movable lens group 45 is supported by the second movable lens frame 28. Further, to the second movable lens frame 28, the stopper mechanism 70 is attached. Further, the first movable lens frame 25 is disposed on one side (X1 side) in the optical axis L direction relative to the second movable lens frame 28, and the shock absorbing member 66 (abutting member) is disposed on one side (X1 side) in the optical axis L direction relative to the first movable lens frame 25. Further, the elastic shock absorbing members 60 are disposed at portions facing each other on one of the first movable lens frame 25 and the second movable lens frame 28. Besides, when the first movable lens frame 25 is pushed to one side (X1 side) in the optical axis L direction together with the second movable lens frame 28 by the driving of the voice coil motors 55, the first movable lens frame 25 is held between the shock absorbing member 66 (abutting member) and the shock absorbing members 60, and at the same time, the second movable lens frame 28 is held between the shock absorbing members 60 and the turn stopper 75 (stopper member).

For this reason, when the voice coil motors 55 are driven to move the second movable lens frame 28 to the front end portion side (one side; X1 side) along the optical axis L direction, the second movable lens frame 28 pushes the first movable lens frame 25. At this time, the shock absorbing members 60 are disposed between the first movable lens frame 25 and the second movable lens frame 28, so that the occurrence of abnormal noise caused by a collision between them is prevented.

Further, the drive motor 72 (driving mechanism) of the stopper mechanism 70 is activated to bring the turn stopper 75 (stopper member) into contact with the second movable lens frame 28, and thereby the first movable lens frame 25 and the second movable lens frame 28 are held between the turn stopper 75 (stopper member) and the shock absorbing member 66 (abutting member) with the shock absorbing members 60 existing therebetween. Accordingly, the movements of the first movable lens frame 25 (first movable lens group 44) and the second movable lens frame 28 (second movable lens group 45) inside the lens barrel 10 are better prevented, and it becomes possible to prevent the occurrence of abnormal noise caused by a collision between these inside the lens barrel 10. Thereby, it is possible to prevent giving an unpleasant impression to a user. Further, the above-described collision prevention makes it possible to prevent shortening of the product-life cycle of the lens barrel 10.

Further, in this embodiment, on the second movable lens frame 28 (movable lens frame), the long-shaped sleeve portion for locking 306 including the locking recessed portion 309 (stepped portion) with the end surface 309*a* (locking surface) on which the turn stopper 75 (stopper member) is locked is provided.

For this reason, the locking recessed portion 309 (stepped portion) is provided in the long-shaped sleeve portion for locking 306, so that it becomes possible to increase the positional selectivity of the locking recessed portion 309

(stepped portion). Further, in the case where the long-shaped sleeve portion for locking 306 does not exist and the locking recessed portion (stepped portion) is formed in the ring-shaped portion 301 or the lens supporting frame 29, the turn stopper 75 is inserted into the locking recessed portion 309, which causes a load to be applied to the ring-shaped portion 301 and the lens supporting frame 29 when the first movable lens frame 25 and the second movable lens frame 28 are held. These load deformations and the like cause a state where the optical axis of the second movable lens group 45 is easily misaligned. However, the locking recessed portion 309 (stepped portion) is provided in the long-shaped sleeve portion for locking 306 which has high positional selectivity, and thereby the deformations of the ring-shaped portion 301 and the lens supporting frame 29 caused by the applied load are prevented, and thus the optical axis misalignment of the second movable lens group 45 is well prevented from being caused.

Further, in this embodiment, the sleeve portion for locking 306 is provided on the side closer to the voice coil motor 55 than to the long-axis cylindrical portion 304 into which the guide shaft G3 to guide sliding of the second movable lens frame 28 (movable lens frame) is inserted. For this reason, it is possible to increase the weight, of the second movable lens frame 28, on the side where the sleeve portion for locking 306 is provided. Then, the turn stopper 75 (stopper member) is brought into contact with the locking recessed portion 309 (stepped portion) on the heavy sleeve portion for locking 306 side to stop the second movable lens frame 28, to then make a state where rattling caused when the first movable lens frame 25 and the second movable lens frame 28 are held does not occur easily.

That is, contrary to the above, in the case where the sleeve portion for locking 306 is provided on the side farther from the voice coil motor 55 than from the cylindrical portion 304, due to being far from the voice coil motor 55, the weight, of the second movable lens frame 28, on the side where the sleeve portion for locking 306 is provided decreases. In this case, when the turn stopper 75 (stopper member) is brought into contact with the locking recessed portion 309 (stepped portion) in the sleeve portion for locking 306, the second movable lens frame 28 rattles easily due to the inertia of a heavy portion of the voice coil motor 55 or the like. However, in the second movable lens frame 28 of this embodiment, by increasing the weight on the side where the sleeve portion for locking 306 is provided, the above-described rattling does not occur easily when the second movable lens frame 28 is stopped and the first movable lens frame 25 and the second movable lens frame 28 are held.

Further, in this embodiment, the drive motor 72 (driving mechanism) of the stopper mechanism 70 is a stepping motor, and the stopper member is the turn stopper 75 to be turned by the drive motor 72 (stepping motor).

For this reason, it becomes possible to easily manage a displacement amount (turning amount) of the turn stopper 75 (stopper member) by the number of steps (number of pulses) of the drive motor 72 (stepping motor). Here, in the case where the drive motor 72 (driving mechanism) is, for example, a DC motor and the displacement amount (turning amount) of the turn stopper 75 (stopper member) is managed by using an encoder or the like, an increase in size of the lens barrel 10 may be caused, but such an increase in size can be prevented. Further, as compared to the case where a solenoid is used as the driving mechanism, using the stepping motor as the drive motor 72 makes it possible to achieve downsizing of the lens barrel 10.

Further, this embodiment includes the lens control unit 100 (control means) that controls driving of the voice coil motors 55 and the drive motor 72 (stepping motor). Then, in the case where it is determined that the power of the camera main body 110 to which the lens barrel 10 is attached is off or the case where it is determined that the lens barrel 10 has been released from the camera main body 110, the lens control unit 100 (control means) controls the driving of the voice coil motors 55 to move the second movable lens frame 28 to one side along the optical axis L direction, and thereby the first movable lens frame 25 is brought into a state of being held between the shock absorbing member 66 (abutting member) and the shock absorbing members 60, and the second movable lens frame 28 is brought into a state of being held between the shock absorbing members 60 and the turn stopper 75 (stopper member). Further, in a state where they are held, the lens control unit 100 (control means) controls the driving of the drive motor 72 (stepping motor) to turn the turn stopper 75 (turn stopper) to the abutting position from the retracted position, and thereby the turn stopper 75 is locked on the end surface 309a (locking surface) of the locking recessed portion 309 (stepped portion).

For this reason, before the voice coil motors 55 are not energized, the lens control unit 100 controls the drivings of the voice coil motors 55 and the drive motor 72 (stepping motor), and thereby the above-described holding states of the first movable lens frame 25 and the second movable lens frame 28 are settled. Thereby, the first movable lens frame 25 (first movable lens group 44) and the second movable lens frame 28 (second movable lens group 45) are much better prevented from moving inside the lens barrel 10, and it becomes possible to prevent the occurrence of abnormal noise caused by a collision between them. Thereby, it is possible to prevent giving an unpleasant impression to a user. Further, by the above-described collision prevention, shortening the product-life cycle of the lens barrel 10 is prevented.

Further, the camera device 1 in this embodiment includes the lens barrel 10 and the camera main body 110 to which the lens barrel 10 is attached. For this reason, the second movable lens frame 28 (movable lens frame) is prevented from moving in the lens barrel 10 of the camera device 1 in a state where the voice coil motors 55 are not energized. Therefore, it becomes possible to prevent the occurrence of abnormal noise caused by the second movable lens frame 28 moving inside the lens barrel 10. Thereby, it is possible to prevent giving an unpleasant impression to a user.

Further, the second movable lens frame 28 is prevented from moving, and thereby a collision of the second movable lens group 45 inside the lens barrel 10 is prevented. Therefore, shortening the product-life cycle of the lens barrel 10 is prevented.

<Modified Example>

As described above, although one embodiment of the present invention has been explained, the present invention can be variously modified besides this. There will be explained modified examples below.

In the above-described embodiment, as the movable lens group, the first movable lens group 44 and the second movable lens group 45 that perform focusing have been explained. However, the movable lens group is not limited to the first movable lens group 44 and the second movable lens group 45 that perform focusing. For example, a lens group consisting of zoom lenses may be employed as the movable lens group.

Further, in the above-described embodiment, the first movable lens group 44 and the second movable lens group 45 correspond to the movable lens group, but a configuration having only one of them may be employed, or a configuration having a movable lens group other than the first movable lens group 44 and the second movable lens group 45 may be employed. Further, the first movable lens frame 25 and the second movable lens frame 28 correspond to the movable lens frame, but a configuration having only one of them may be employed, or a configuration having a movable lens frame other than the first movable lens frame 25 and the second movable lens frame 28 may be employed.

Further, in the above-described embodiment, the turn stopper 75 corresponds to the stopper member. However, the stopper member may be any other than the turn stopper 75. For example, a member having a high friction coefficient such as an elastomer may correspond to the stopper member. In this case, a configuration may be employed in which such a stopper member is pressed against any portion of the sleeve portion for locking 306 by driving of the drive motor 72, to thereby prevent the second movable lens frame 28 from moving. Further, the stopper member may have a configuration in which a member equivalent to the locking projection 75*c* is linearly moved, inserted into and removed from the locking recessed portion 309, and moved to the abutting position and the retracted position.

Further, in the case where, for example, the locking recessed portion 309 is formed to have substantially the same width as that of the turn stopper 75, when the turn stopper 75 is inserted into the locking recessed portion 309, the movement of the second movable lens frame 28 (movable lens frame) is prevented in a state where the voice coil motors 55 are not energized. In this case, the locking recessed portion 309 may correspond to the stopper member together with the turn stopper 75. Incidentally, in the case where the locking recessed portion 309 corresponds to a part of the stopper member, the locking recessed portion 309 may be provided with a tapered portion that is inclined with respect to the moving direction of the turn stopper 75, in order to guide insertion of the turn stopper 75 into the locking recessed portion 309.

Further, in the above-described embodiment, the shock absorbing member 66 corresponds to the abutting member. However, the abutting member is not limited to the shock absorbing member 66, and the front end fixing frame 21, the outer peripheral barrel portion 20, and other members may correspond to the abutting member.

Further, in the above-described embodiment, the configuration is employed in which the shock absorbing members 60 are disposed between the first movable lens frame 25 and the second movable lens frame 28. However, a configuration may be employed in which the shock absorbing members 60 are not provided but resilient members such as springs are provided. Further, a configuration may be employed in which members corresponding to the shock absorbing members 60 are not provided.

Further, in the above-described embodiment, the locking recessed portion 309 corresponds to the stepped portion. However, a projecting member other than the locking recessed portion 309 may correspond to the stepped portion.

The invention claimed is:

1. A lens barrel including at least one movable lens group capable of moving to one side and the other side in an optical axis direction and an outer peripheral barrel portion, the lens barrel comprising:
    a movable lens frame that moves integrally with the at least one movable lens group;
    a voice coil motor that drives the at least one movable lens group and the movable lens frame along the optical axis direction; and
    a stopper mechanism that stops movement of the movable lens frame to one direction and the other direction in the optical axis direction and is supported by the outer peripheral barrel portion, wherein
    the stopper mechanism includes:
        a stopper member that moves to a retracted position retracted from an abutting position where the stopper member abuts on the movable lens frame while the voice coil motor is energized and moves to the abutting position where the stopper member abuts on the movable lens frame while the voice coil motor is not energized; and
        a driving mechanism that moves the stopper member between the retracted position and the abutting position;
    the stopper mechanism includes an abutting member that abuts on the movable lens frame together with the stopper member when the movable lens frame moves to an end portion on one side in the optical axis direction,
    the movable lens frame is held between the stopper member and the abutting member,
    the lens barrel comprises:
        at least a first movable lens group and a second movable lens group that correspond to the at least one movable lens group, and
        at least a first movable lens frame and a second movable lens frame that correspond to the movable lens frame,
    the first movable lens group is supported by the first movable lens frame and the second movable lens group is supported by the second movable lens frame,
    the first movable lens frame is disposed on the one side in the optical axis direction relative to the second movable lens frame,
    the abutting member is disposed on the one side in the optical axis direction relative to the first movable lens frame;
    a second shock absorbing member with elasticity is disposed at portions facing each other on one of the first movable lens frame and the second movable lens frame, and
    when the first movable lens frame is pushed to the one side in the optical axis direction together with the second movable lens frame by driving of the voice coil motor, the first movable lens frame is held between the abutting member and the second shock absorbing members and the second movable lens frame is held between the second shock absorbing members and the stopper member.

2. The lens barrel according to claim 1, wherein the abutting member is a first shock absorbing member with elasticity.

3. The lens barrel according to claim 1, further comprising:
    a long-shaped sleeve portion for locking that is provided on the movable lens frame and includes a stepped portion with a locking surface on which the stopper member is locked.

4. The lens barrel according to claim 3, wherein the long-shaped sleeve portion for locking is provided on a side closer to the voice coil motor than to a long-axis cylindrical portion into which a guide shaft to guide sliding of the movable lens frame is inserted.

5. The lens barrel according to claim 1, wherein
the driving mechanism includes a stepping motor, and
the stopper member is a turn stopper that is turned by the stepping motor.

6. The lens barrel according to claim 1, further comprising:
a control means that controls driving of the voice coil motor and the driving mechanism, wherein
when it is determined that power of a camera main body to which the lens barrel is attached is off or it is determined that the lens barrel has been released from the camera main body, the control means controls driving of the voice coil motor to move the second movable lens frame to the one side in the optical axis direction, and
after the second movable lens frame is moved to the one side in the optical axis direction, the control means controls driving of the driving mechanism to move the stopper member to the abutting position.

7. A camera device, comprising:
a lens barrel including at least one movable lens group capable of moving to one side and the other side in an optical axis direction and an outer peripheral barrel portion, the lens barrel comprising:
    a movable lens frame that moves integrally with the at least one movable lens group;
    a voice coil motor that drives the at least one movable lens group and the movable lens frame along the optical axis direction; and
    a stopper mechanism that stops movement of the movable lens frame to one direction and the other direction in the optical axis direction and is supported by the outer peripheral barrel portion, wherein
    the stopper mechanism includes:
        a stopper member that moves to a retracted position retracted from an abutting position where the stopper member abuts on the movable lens frame while the voice coil motor is energized and moves to the abutting position where the stopper member abuts on the movable lens frame while the voice coil motor is not energized; and
        a driving mechanism that moves the stopper member between the retracted position and the abutting position;
    the stopper mechanism includes an abutting member that abuts on the movable lens frame together with the stopper member when the movable lens frame moves to an end portion on one side in the optical axis direction,
    the movable lens frame is held between the stopper member and the abutting member,
    the lens barrel comprises:
        at least a first movable lens group and a second movable lens group that correspond to the at least one movable lens group, and
        at least a first movable lens frame and a second movable lens frame that correspond to the movable lens frame,
    the first movable lens group is supported by the first movable lens frame and the second movable lens group is supported by the second movable lens frame,
    the first movable lens frame is disposed on the one side in the optical axis direction relative to the second movable lens frame,
    the abutting member is disposed on the one side in the optical axis direction relative to the first movable lens frame;
    a second shock absorbing member with elasticity is disposed at portions facing each other on one of the first movable lens frame and the second movable lens frame, and
    when the first movable lens frame is pushed to the one side in the optical axis direction together with the second movable lens frame by driving of the voice coil motor, the first movable lens frame is held between the abutting member and the second shock absorbing members and the second movable lens frame is held between the second shock absorbing members and the stopper member; and
a camera main body to which the lens barrel is attached.

* * * * *